(12) United States Patent
Paniccia et al.

(10) Patent No.: US 6,504,965 B2
(45) Date of Patent: Jan. 7, 2003

(54) METHOD AND APPARATUS FOR SELF-TESTING AND MAINTAINING ALIGNMENT OF AN OPTICAL BEAM IN AN OPTICAL SWITCH

(75) Inventors: Mario J. Paniccia, Santa Clara, CA (US); Dean A. Samara-Rubio, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 09/733,795

(22) Filed: Dec. 7, 2000

(65) Prior Publication Data

US 2002/0172448 A1 Nov. 21, 2002

(51) Int. Cl.⁷ .............................. G02B 6/35; G02B 6/42
(52) U.S. Cl. ........................................... 385/16; 385/17
(58) Field of Search .............................. 385/16, 17, 24, 385/52

(56) References Cited

U.S. PATENT DOCUMENTS 5,706,374 A * 1/1998 Vinchant ..................... 385/16
5,915,051 A * 6/1999 Damask et al. ............... 385/16

OTHER PUBLICATIONS

E.D. Novak, L. Ding, Y.T. Loh, and C. Hu, "Speed, Power, and Yield Comparison of Thin Bonded SOI versus Bulk SMOS Technologies", in *Proceedings 1994 IEEE International SOI Conference*, Oct. 1994, VLSI Technology, Inc., San Jose, CA, pp. 41–42.

* cited by examiner

*Primary Examiner*—Georgia Epps
*Assistant Examiner*—Mohammad Abutayeh
(74) *Attorney, Agent, or Firm*—Blakely, Sokoloff, Taylor & Zafman LLP (57) ABSTRACT

An optical processing element such as an optical switch for which continuous or periodic self-testing and/or alignment is provided. In one embodiment, an optical sensor is disposed in a semiconductor substrate layer within a region surrounding an optical path of an optical output port of the optical processing element. In one embodiment, an optical fiber optically coupled to the optical output port is disposed in a V-groove in which the optical sensor is disposed. In one embodiment, circuitry is coupled to the optical sensor to adjust continuously or periodically over time the alignment of an optical beam directed to the optical output port.

29 Claims, 3 Drawing Sheets

METHOD AND APPARATUS FOR SELF-TESTING AND MAINTAINING ALIGNMENT OF AN OPTICAL BEAM IN AN OPTICAL SWITCH

BACKGROUND OF THE INVENTION

1. Field of the Invention

The present invention relates generally to the control of optical beam processing and, more specifically, the present invention relates to the control of systems that switch or route optical signals.

2. Background Information

The need for fast and efficient optical processing and switching is increasing as Internet data traffic growth rate is overtaking voice traffic pushing the need for optical communications. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

All types of optical switching devices require accurate alignment of the optical beams exiting the component to the receiving optical fiber(s) or ports. The mechanisms controlling this alignment can drift and age with time and material fatigue and in response to variations in the drive circuitry, temperature, and other factors.

BRIEF DESCRIPTION OF THE DRAWINGS

The present invention is illustrated by way of example and not limitation in the accompanying figures.

DETAILED DESCRIPTION

Methods and apparatuses for self-testing and maintaining alignment in an optical processing element such as an optical switch are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical switch or router, or other processing element is provided in a fully integrated solution on a single integrated circuit chip. One embodiment of the presently described optical switch includes optical sensors and corresponding circuitry for self-test and alignment maintenance of an optical beam. Embodiments of the described optical switch can be used in a variety of high bandwidth applications including multi-processor, telecommunications, networking or the like. In one embodiment, the presently described processing device is a switch based on a phased-array of optical beams whose phases are modulated by the charge collected on the plates of trench capacitors disposed in a silicon semiconductor substrate layer. In one embodiment, the phases are modulated in response to a signal or signals. In one embodiment, the optical sensors are disposed within a region surrounding an optical path of the optical output ports such that misaligned optical beams can be detected and/or realigned. In one embodiment, the control circuitry used to generate the signal or signals and maintain the alignment of the optical beam is integrated in the same die as the array. Thus, in one embodiment the array and the control circuitry are fully integrated on the same integrated circuit chip. In one embodiment, the optical beam is switched by the array selectively attenuating the optical beam. In another embodiment, the optical beam is switched by selectively modulating the phase of at least a portion of the optical beam.

In one embodiment, an optical processing element including a one-dimensional array is formed with the trench capacitors disposed in the semiconductor substrate layer. In another embodiment, an optical processing element including a two-dimensional array is formed with the trench capacitors disposed in the semiconductor substrate layer. In one embodiment, a phase array including uncharged and selectively modulated charged regions is provided by the array trench capacitors. In one embodiment, the interference intensity pattern caused by the phase array is modulated in response to a signal. For instance, by selectively biasing individual trench capacitors in one embodiment of the phase array, the charge distribution across the phase array can be controlled by the signal in one embodiment of the present invention.

As a result, the amount of phase modulation of different portions of the optical beam passing through different portions the phase array is controlled by the signal or signals in one embodiment. A resulting interference occurs between the phase modulated portions and non-phase modulated portions of the optical beam. The interference among the different portions of the optical beam results in an interference intensity pattern of the phase array, which may be controlled by the signal or signals in one embodiment of the present invention. By adjusting the interference intensity pattern of the phase array, an incident optical beam is selectively directed to one of a plurality of output ports in accordance with the teachings of the present invention. Optical sensors disposed within a region surrounding an optical path of the selected output optical port is used to detect alignment of the optical beam and continuous or periodic adjustments can be made by integrated circuitry generating the signal or signals to maintain alignment of the optical beam resulting. In one embodiment, continuous or periodic self-test and/or self-correction of the optical beam is therefore provided.

Figure 1:
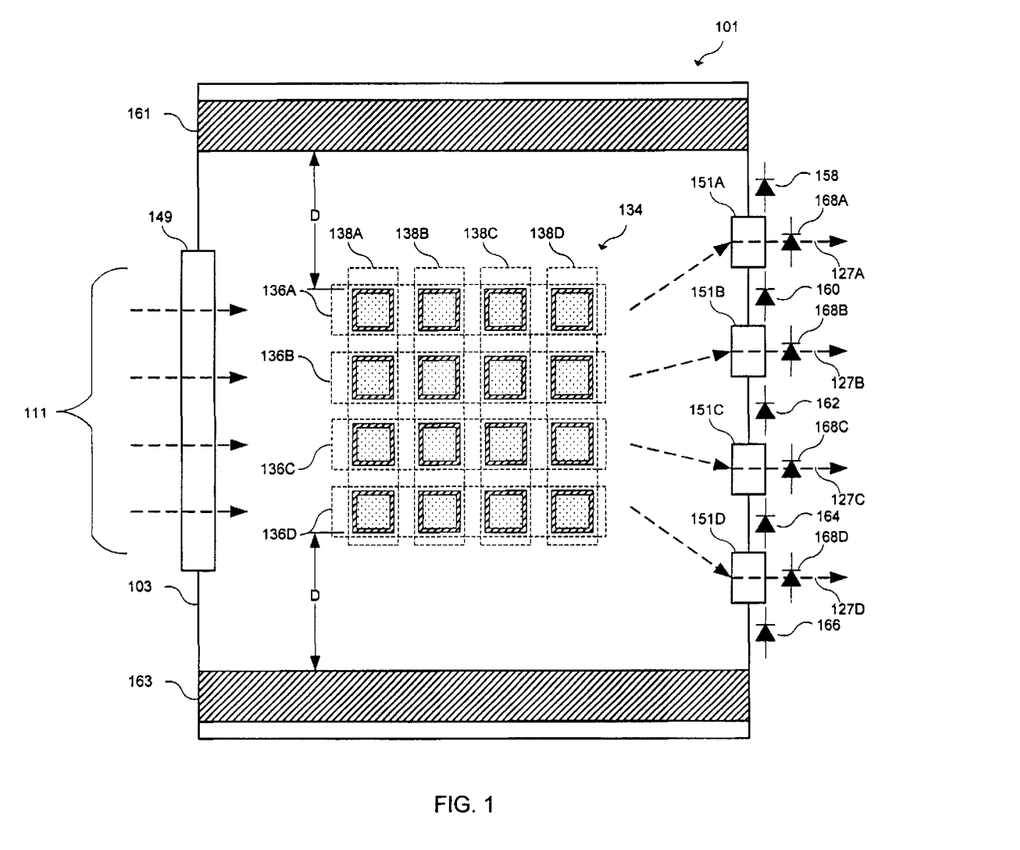
FIG. 1 is a top view illustration of one embodiment of an optical processing element including an optical switching to selectively direct an incident optical beam to one of a plurality of output ports including optical sensors for self-test and alignment maintenance of an optical beam in accordance with the teachings of the present invention.

FIG. 1 is a top view illustration of one embodiment of an optical processing element 101 such as for example an optical switch including an optical switching device 134. In one embodiment, optical switching device 134 includes a phase array of trench capacitors to selectively direct an optical beam 111 to one of a plurality of output ports 151A, 151B, 151C and 15D in accordance with the teachings of the present invention. In addition, a plurality of optical sensors 158, 160, 162, 164, 166, 168A, 168B, 168C and 168D are disposed within regions surrounding optical paths of each of the plurality of optical output ports 151A, 151B, 151C and 15D to test for and correct misaligned optical beams 127A, 127B, 127C or 127D in accordance with the teachings of one embodiment of the present invention.

As illustrated, one embodiment of optical processing element 101 includes an optical input port 149 optically coupled to one side of semiconductor substrate layer 103. Optical processing element 101 also includes a plurality of optical output ports 151A, 151B, 151C and 151D optically coupled to the opposite side of semiconductor substrate layer 103. In one embodiment, optical fibers, waveguides or the like are optically coupled to optical input port 149 and optical output ports 151A, 151B, 151C and 151D. Optical switching device 134 including an array of trench capacitors is disposed in the semiconductor substrate layer 103 between optical input port 149 and optical output ports 151A, 151B, 151C and 151D. In the depicted embodiment, optical beam 111 is directed from optical input port 149 through semiconductor substrate layer 103 to the optical switching device 134.

In one embodiment, optical switching device 134 includes is a two-dimensional phase array of trench capacitors including a plurality of rows 136A, 136B, 136C and 136D of trench capacitors and a plurality of columns 138A, 138B, 138C and 138D of trench capacitors. In another embodiment, optical switching device 134 includes a one-dimensional phase array of trench capacitors including a plurality of rows 136A, 136B, 136C and 136D. In one embodiment, each row 136A, 136B, 136C and 136D are coupled to receive one of a plurality signals to bias each individual row 136A, 136B, 136C and 136D of the optical switching device 134. In another embodiment, each trench capacitor in a two dimensional phase array of optical switching device 134 is separately coupled to receive one of a plurality signals of a signal to bias optical switching device 134.

In one embodiment, optical confinement regions 161 and 163 are disposed along the optical path between optical input port 149 and the optical output ports 151A, 151B, 151C and 151D. As shown in the embodiment depicted in FIG. 1, optical confinement regions 161 and 163 are disposed a distance D away from insulating regions of the trench capacitors of optical switching device 134. In one embodiment, D is a distance greater than or equal to zero.

In one embodiment, integrated circuitry used to generate a plurality signals to bias each individual row 136A, 136B, 136C and 136D of optical switching device 134 is generated with integrated circuitry disposed on the same wafer as optical processing element 101. In one embodiment, this integrated circuitry is coupled to the plurality of optical sensors 158, 160, 162, 164, 166, 168A, 168B, 168C and 168D to test for and/or correct misaligned optical beams 127A, 127B, 127C or 127D. In one embodiment, this integrated circuitry is disposed in a different semiconductor substrate layer across an optical confinement layer. In still another embodiment, the integrated circuitry used to generate the signal or signals coupled to bias each individual row 136A, 136B, 136C and 136D of optical switching device 134 is disposed in a semiconductor substrate external to optical processing element 101.

Operation of one embodiment of the phase array optical switching device 134 is as follows. In one embodiment, semiconductor substrate layer 103 is coupled to a voltage such as ground and is doped to include free charge carriers. In one embodiment, at least each row 136A, 136B, 136C and 136D of optical switching device 134 is separately biased by the signal to control a charge distribution across optical switching device 134. For instance, assume in one example that semiconductor substrate layer 103 is n type doped silicon and that the free charge carriers are therefore electrons. Assume further that the trench capacitors in row 136A are coupled to receive for example +3 volts from the signal, the trench capacitors in row 136B are coupled to receive +2 volts, the trench capacitors in row 136C are coupled to receive +1 volt and that the trench capacitors in row 136D are coupled to receive +0.5 volts. It is appreciated that these voltages are provided for explanation purposes only and that other voltages can be applied as appropriate. Since each trench capacitor is coupled to a positive voltage in this example, each trench capacitor will attract electrons in semiconductor substrate layer 103. In addition, the trench capacitors that are coupled to receive a higher voltage of the signal will attract more electrons. As a result, the charge density of the free charge carriers will be proportional to the voltage applied to the particular trench capacitor. Thus, in one embodiment, there is a gradient in the charge distribution of free charge carriers across optical switching device 134, which is controlled by the signal.

Continuing with the example discussed above with reference to FIG. 1, assume now that optical beam 111 is directed from optical input port 149 through semiconductor substrate layer 103 to optical switching device 134. A portion of optical beam 111 will pass through the trench capacitors of row 136A. A portion of optical beam 111 will pass through the semiconductor substrate layer 103 between rows 136A and 136B. A portion of optical beam 111 will pass through the trench capacitors of row 136B. A portion of optical beam 111 will pass through the semiconductor substrate layer 103 between rows 136B and 136C. A portion of optical beam 111 will pass through the trench capacitors of row 136C. A portion of optical beam 111 will pass through the semiconductor substrate layer 103 between rows 136C and 136D. Finally, a portion of optical beam 111 will pass through the trench capacitors of row 136D.

The portions of optical beam 111 passing through rows 136A, 136B, 136C and 136D of optical switching device 134 will experience a modulation of phase since these portions of optical beam 111 pass through the densely charged regions. In one embodiment, the phase of the portions of optical beam 111 passing through densely charged regions is modulated due to the plasma optical effect. The plasma optical effect arises due to an interaction between the optical electric field vector and free charge carriers that may be present along the propagation path of optical beam 111. As a result, the portion of optical beam 111 passing through row 136A in one embodiment will experience more phase modulation than the portion of optical beam 111 passing through row 136D since the free charge carrier density is greater in row 136A than in row 136D due to the higher applied voltage. The portions of optical beam 111 passing between the rows will experience relatively no phase modulation, since there are substantially no free charge carriers in these portions of optical switching device 134. A resulting diffraction interference occurs between the phase modulated portions and non-phase modulated portions of optical beam 111. The interference among the different portions of the optical beam results in an interference intensity pattern caused by optical switching device 134, which may be controlled by the signal or signals as applied to the trench capacitors of optical switching device 134.

In another embodiment, additional optical confinement regions (not shown) are disposed between each row 136A, 136B, 136C and 136D of optical switching device 134 and D is equal to zero. As a result, there are no portions of optical beam 111 passing between or around rows 136A, 136B, 136C and 136D in this embodiment. Accordingly, in this embodiment, the interference among different portions of optical beam 111 are the result of different portions of optical beam 111 passing through different rows 136A, 136B, 136C and 136D. For instance, the portion of optical beam 111 passing through row 136A interferes with the portions of optical beam 111 passing through the other rows 136B, 136C and 136D of optical switching device 134.

As can be appreciated to those skilled in the art, the interference intensity pattern includes a plurality of maximas that are directed away from optical switching device 134 at an angle θ relative to the incident optical beam. In one embodiment of the present invention, the interference intensity pattern of the phase array optical switching device 134 can be controlled by a signal controlling the distribution of charge across optical switching device 134. As a result, the angular locations θ of the maximas of the interference intensity pattern caused by optical switching device can be controlled by the signal applied to the trench capacitors of optical switching device 134. Thus, the signal applied to optical switching device 134 can be used to selectively direct optical beam 111 to either optical output port 151A, 151B, 151C or 151D. In one embodiment, each optical output port 151A, 151B, 151C or 151D represents a different output channel of optical switch 101.

In one embodiment, the number, length and spacing of trench capacitors in the phase array of optical switching device 134 are determined by the number of output channels of optical switch 101. By applying the appropriate bias voltages to the trench capacitors of optical switching device 134 to control the gradient of the charge distribution across optical switching device 134, the resulting interference of the outgoing optical beam 127A, 127B, 127C or 127D is directed or steered to the optical output port 151A, 151B, 151C or 151D of interest. That is, by appropriately controlling the gradient of the charge distribution across optical switching device 134, the maximas of interference intensity pattern caused by optical switching device 134 can be shifted to illuminate the selected optical output port 151A, 151B, 151C or 151D.

As illustrated in the embodiment depicted in FIG. 1, each one of the plurality of optical output ports 151A, 151B, 151C and 151D have at least one optical sensor disposed within a region surrounding an optical path of each respective optical output port. For instance, optical sensors 158, 160 and 168A are disposed within a region surrounding an optical path of optical output port 151A in the depicted embodiment. It is appreciated that not necessarily all of the optical sensors 158, 160 and 168A be within the region surrounding the optical path of optical port 151A in order to provide self-test and alignment maintenance in accordance with the teachings of the present invention.

In operation, as optical sensor 158 detects increasing amounts of optical energy from switched optical beam 127A, the circuitry (not shown) receives this information and determines that switched optical beam 127A is out of alignment. Accordingly, the circuitry coupled to optical sensor 158 in one embodiment may continuously or periodically adjust the signals to drive optical switching device to realign switched optical beam 127A. Similarly, as optical sensor 160 detects more optical energy from switched optical beam 127A, the circuitry receives this information and may continuously or periodically adjust the signals to drive optical switching device accordingly to realign switched optical beam 127A. In one embodiment, optical sensor 168A is optically coupled to optical output port 151A. As optical sensor detects decreasing amounts of optical energy from switched optical beam 127A, the circuitry receives this information and determines that switched optical beam 127A is drifting out of alignment. Accordingly, the circuitry may continuously or periodically adjust the signals to drive optical switching device to realign switched optical beam 127A. It is appreciated that embodiments of the present invention enable continuous or periodic self-test and/or realignment of misaligned optical beams without the need for bleeding off or splitting optical power that would otherwise be received by optical receivers resulting in inefficiency.

It is appreciated that the embodiment of the phase array of optical switching device 134 illustrated in FIG. 1 has a symmetric geometry of rows and columns. It is appreciated that in other embodiments, the phase array of optical switching device 134 is not limited to having a symmetric geometry. For instance, in another embodiment, the phase array of optical switching device 134 is arranged in an asymmetric geometry in accordance with the teachings of the present invention.

In yet another embodiment, some or all of the individual capacitors within a particular row and/or column of the phase array of optical switching device 134 are selectively charged by the signal to control the gradient in the charge distribution of free charge carriers across the phase array. In this embodiment, a fixed voltage or the same voltage could be applied by the signal to charge some selected particular rows and/or columns of capacitors to control charge distribution across the phase array. Thus, the phase array is charged asymmetrically by the signal to control or steer the incident optical beam to the selected optical output port. In this embodiment, the phase array could have a symmetric or asymmetric arrangement of rows and columns, and the rows and/or columns of capacitors in the phase array would be symmetrically or asymmetrically charged by the signal.

In one embodiment, a plurality of phase arrays such as for example those described in FIG. 1 are disposed on the same semiconductor substrate layer to provide an M×N channel optical switch or router. In another embodiment, a multi-wavelength optical beam is separated into a plurality of single-wavelength optical beams. Each of these single-wavelength optical beams may then be directed to a corresponding phase array to be selectively directed to any one of a plurality of output ports of an optical switch in one embodiment of the present invention.

It is appreciated that optical switching device 134 of optical processing element 101 has been described using trench capacitors for discussion purposes. Trench capacitors in accordance with the teachings of the present invention produce an index of refraction change in the semiconductor substrate layers in which the trench capacitors are disposed. As discussed, the changes in index of refraction produce phase shifts of optical beams. In some embodiments, the effects of the phase shifts of the optical beams produce optical beam steering such that optical beams may be selectively directed to a plurality of optical output ports in accordance with the teachings of the present invention. By using disposed optical sensors 158, 160, 162, 164, 166, 168A, 168B, 168C and 168D within regions surrounding optical paths of the plurality of optical output ports to detect misaligned optical beams, continuous or periodic self-test and/or alignment can therefore be realized by adjusting the control signals coupled to be received by optical switching device 134.

It is appreciated that in other embodiments, other types of optical processing elements or optical switching devices may be employed in accordance with the teachings of the present invention. Other known types of optical processing elements or optical switching devices known optical processing devices or optical switches such as for example MEMS based optical switches, thermal capillary based optical switches, liquid crystal based optical switches, arrayed waveguide gratings (AWG), optical add/drops or any other suitable optical processing elements that output a plurality of optical beams, such as for example optical beams.

Figure 2:
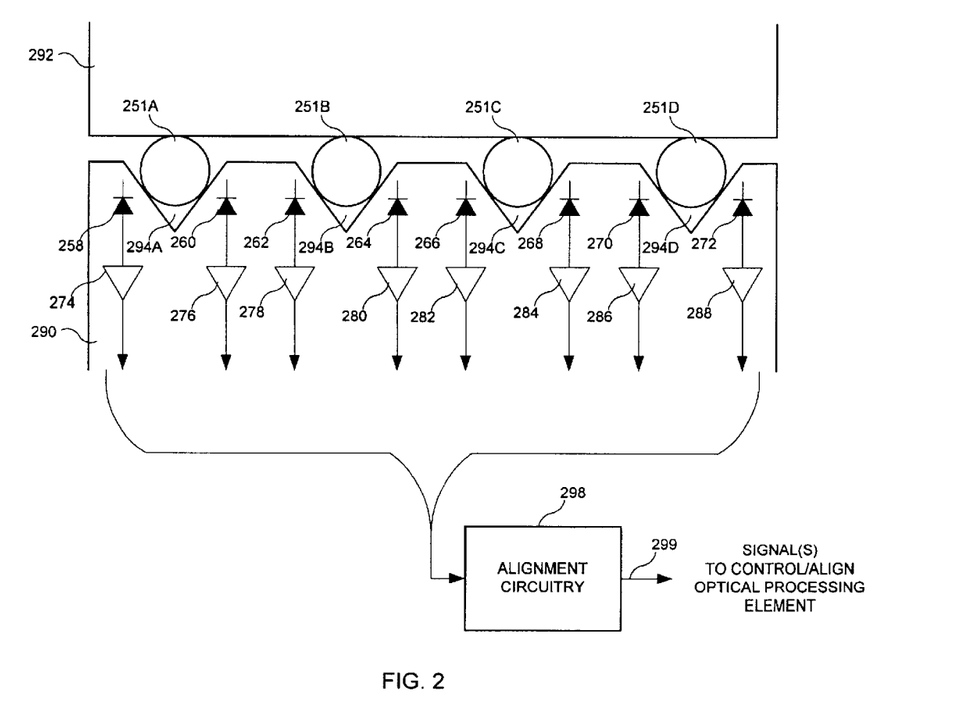
FIG. 2 is a cross section illustration of one embodiment of optical sensors disposed in a fiber array assembly within regions surrounding an optical path of an optical output ports of an optical processing element in accordance with the teachings of the present invention.

FIG. 2 is an illustration of one embodiment of a fiber array assembly including a plurality of optical fibers 251A, 251B, 251C and 251D that are optically coupled to optical output ports 151A, 151B, 151C and 151D, respectively, of FIG. 1. In one embodiment, optical fibers 251A, 251B, 251C and 251D are single mode optical fibers that are disposed between a semiconductor substrate layer 292 and spaced apart in V-grooves 294A, 294B, 294C and 294D, respectively, that are formed in a semiconductor substrate layer 290. In one embodiment, semiconductor substrate layer 290 comprises silicon and V-grooves 294A, 294B, 294C and 294D are formed in the [1 1 1] planes of the silicon. In one embodiment, V-grooves 294A, 294B, 294C and 294D are spaced apart with a uniform distance of 250 µm between each V-groove. In other embodiments, V-grooves 294A, 294B, 294C and 294D may be spaced apart by different distances in accordance with the teachings of the present invention. In one embodiment, semiconductor substrate layer 290 is positioned next to semiconductor substrate 103 such that optical fibers 251A, 251B, 251C and 251D are optically coupled to optical output ports 151A, 151B, 151C and 151D.

FIG. 2 also shows that at least one optical sensor is disposed within regions surrounding optical paths of the optical fibers 251A, 251B, 251C and 251D. For instance, optical sensors 258 and 260 are disposed within the region surrounding the optical path of optical fiber 251A, optical sensors 262 and 264 are disposed within the region surrounding the optical path of optical fiber 251B, optical sensors 266 and 268 are disposed within the region surrounding the optical path of optical fiber 251C and optical sensors 270 and 272 are disposed within the region surrounding the optical path of optical fiber 251D. In one embodiment, optical sensors 258, 260, 262, 264, 266, 268, 270 and 272 comprise photodiodes or the like disposed in semiconductor substrate layer 290 to detect optical energy.

In one embodiment, optical sensors 258, 260, 262, 264, 266, 268, 270 and 272 include P-N junctions formed with infrared sensitive material deposited onto or implanted into the silicon [1 1 1] facets of V-grooves 294A, 294B, 294C and 294D. The optical sensors 258, 260, 262, 264, 266, 268, 270 and 272 collect and/or measure the optical energy that is not optically coupled to be received by the cores of optical fibers 251A, 251B, 251C or 251D, but instead propagates in the lossy cladding modes of optical fibers 251A, 251B, 251C or 25 ID. In one embodiment, the infrared sensitive material of optical sensors 258, 260, 262, 264, 266, 268, 270 and 272 may include for example a silicon-germanium alloy or other suitable material for increased optical efficiency depending on for example optical wavelengths. Other embodiments may include III–V semiconductor materials hetero-epitaxially grown onto the silicon [1 1 1] facets of V-grooves 294A, 294B, 294C and 294D.

In one embodiment, outputs of optical sensors 258, 260, 262, 264, 266, 268, 270 and 272 are coupled to driver circuits 274, 276, 278, 280, 282, 284, 286 and 288, respectively. In one embodiment, driver circuits 274, 276, 278, 280, 282, 284, 286 and 288 are included in semiconductor substrate layer 290. In another embodiment, driver circuits 274, 276, 278, 280, 282, 284, 286 and 288 are included in semiconductor substrate layer 103 of FIG. 1. In one embodiment, outputs of driver circuits 274, 276, 278, 280, 282, 284, 286 and 288 are coupled to or included in alignment circuitry 298, which is used to generate signal(s) 299 to drive or control the optical switching device 134 and maintain alignment. In one embodiment, alignment circuitry is included in semiconductor substrate 290. In another embodiment, alignment circuitry 298 is included in the same semiconductor substrate as optical switching device 134, such as for example semiconductor substrate layer 103. In yet another embodiment, alignment circuitry 298 is included in a semiconductor substrate layer across an optical confinement layer included in a silicon on insulator (SOI) wafer including semiconductor substrate layer 103. Continuous or periodic self-testing and/or alignment correction may therefore be performed in accordance with the teachings of the present invention to maintain alignment of optical beams that are not properly aligned or drift out of alignment over time.

Figure 3:
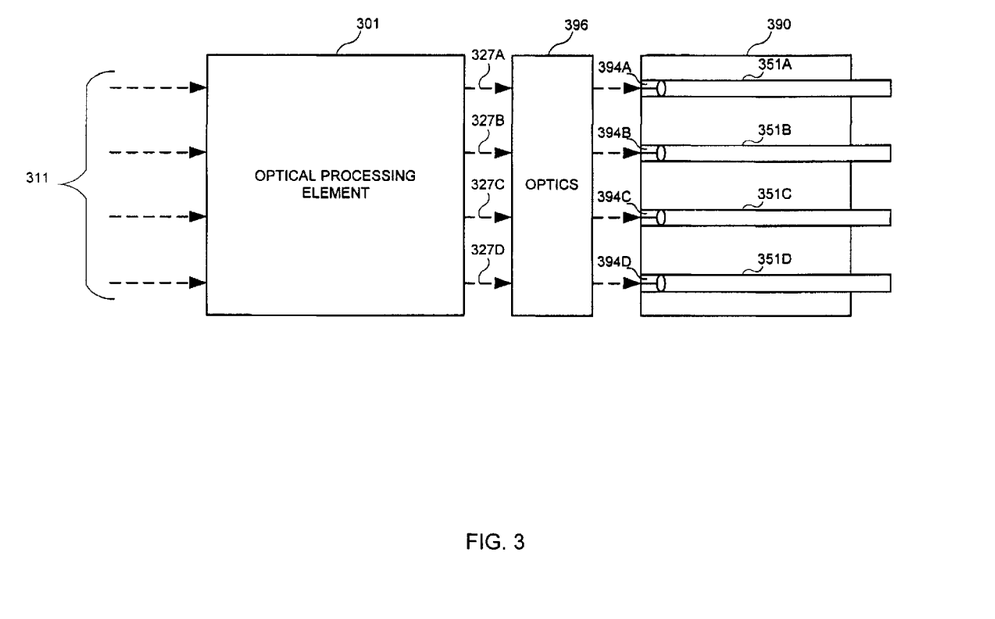
FIG. 3 is a diagram illustrating a fiber array assembly including optical sensors optically coupled to an optical processing element in accordance with the teachings of the present invention.

FIG. 3 is a diagram illustrating a fiber assembly including optical sensors such as for example that shown in FIG. 2 optically coupled to an optical processing element in accordance with the teachings of the present invention. As shown, an optical beam 311 or a plurality of optical beams are directed into an optical processing element 301. In one embodiment, optical processing element 301 includes optical switching devices such as for example those described with respect to FIGS. 1 and 2 above. In other embodiments, optical processing element 301 may include other known optical processing devices or optical switches such as for example MEMS based optical switches, thermal capillary based optical switches, liquid crystal based optical switches, AWGs, optical add/drops, thermal heaters, current injectors, P-N junctions or any other suitable optical processing elements that output a plurality of optical beams, such as for example optical beams 327A, 327B, 327C and 327D, into an array.

In one embodiment, an optics element 396 is optically coupled to receive optical beams 327A, 327B, 327C and 327D and help direct or collimate optical beams 327A, 327B, 327C and 327D. In one embodiment, the optical beams 327A, 327B, 327C and 327D output by optical processing element 301 are received by fiber array assembly including optical fibers 351A, 351B, 351C and 351D disposed in grooves 394A, 394B, 394C and 394D, respectively, of semiconductor substrate 390. In one embodiment, semiconductor substrate 390 includes silicon and grooves 394A, 394B, 394C and 394D are V-grooves formed in the [1 1 1] planes of the silicon. In one embodiment, optical sensors (not shown) are disposed in the grooves 394A, 394B, 394C and 394D as described for example in FIGS. 1 and 2 to collect and/or measure optical energy that is not optically coupled to be received by the cores of optical fibers 351A, 351B, 351C or 351D, but instead propagates in the lossy cladding modes of optical fibers 351A, 351B, 351C or 351D. In one embodiment, outputs of these optical sensors are coupled to be received by drivers and/or alignment circuitry (not shown) such as for example the circuitry described with respect to FIGS. 1 and 2 above. Accordingly, continuous or periodic self-testing and/or alignment correction can be performed in accordance with the teachings of the present invention to maintain alignment of optical beams 327A, 327B, 327C and 327D over time.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   an optical switching device disposed in a first semiconductor substrate layer;
   first and second optical ports disposed in the first semiconductor substrate layer, the first and second optical ports optically coupled to the optical switching device; and
   an optical sensor disposed within a region surrounding an optical path of the second optical port, the optical sensor to detect an alignment of an optical coupling between the optical switching device and the second optical port.

2. The apparatus of claim 1 wherein the optical sensor is one of a plurality of optical sensors disposed in the first semiconductor substrate layer within the region surrounding the optical path of the second optical port.

3. The apparatus of claim 1 wherein the optical sensor is optically coupled to the second optical port.

4. The apparatus of claim 1 further comprising alignment circuitry coupled to the optical sensor, the alignment circuitry coupled to adjust the alignment of the optical coupling between the optical switching device and the second optical port in response to the optical sensor.

5. The apparatus of claim 4 wherein the alignment circuitry is disposed in the first semiconductor substrate layer.

6. The apparatus of claim 4 wherein the alignment circuitry is disposed in a second semiconductor substrate layer, the second semiconductor substrate layer separate from the first semiconductor substrate layer.

7. The apparatus of claim 6 further comprising an optical confinement layer disposed between the first semiconductor substrate layer and the second semiconductor substrate layer.

8. The apparatus of claim 1 wherein the optical sensor comprises a photodiode disposed proximate to the second optical port.

9. The apparatus of claim 8 wherein the photodiode is disposed in a V-groove in a silicon semiconductor substrate.

10. The apparatus of claim 8 wherein the photodiode comprises a P-N junction.

11. The apparatus of claim 8 wherein the photodiode comprises a silicon-germanium alloy.

12. The apparatus of claim 8 wherein the photodiode comprises a III-V semiconductor material.

13. The apparatus of claim 1 wherein the optical sensor comprises a photodiode optically coupled to the second optical port.

14. A method, comprising:
   directing an optical beam through a first optical port into a first semiconductor substrate layer;
   directing the optical beam along the first semiconductor substrate layer through an optical switching device disposed in the first semiconductor substrate layer;
   directing the optical beam to a second optical port in response to a signal coupled to be received by the optical switching device;
   detecting an alignment of an optical coupling between the optical switching device and the second optical port.

15. The method of claim 14 further comprising adjusting the alignment of the optical coupling between the optical switching device and the second optical port.

16. The method of claim 14 wherein said detecting the alignment of the optical coupling between the optical switching device and the second optical port comprises measuring an optical power of a portion of the optical beam that is not coupled to be received by the second optical port.

17. The method of claim 14 further comprising:
   measuring an optical power of a portion of the optical beam that is not optically coupled to be received by the second optical port; and
   reducing the optical power of the portion of the optical beam that is not optically coupled to be received by the second optical port.

18. The method of claim 14 further comprising:
   measuring an optical power of a portion of the optical beam that is optically coupled to be received by the second optical port; and
   increasing the optical power of the portion of the optical beam that is optically coupled to be received by the second optical port.

19. An apparatus, comprising:
   means for receiving an optical beam in a first semiconductor substrate layer;
   means for selectively directing the optical beam from the first semiconductor substrate layer in response to a signal to a means for transmitting the optical beam from the first semiconductor substrate layer; and
   means for detecting an alignment of an optical coupling between the means for selectively directing the optical beam and the means for transmitting the optical beam.

20. The apparatus of claim 19 further comprising means for adjusting the alignment of the optical coupling in response to the means for detecting the alignment of the optical coupling.

21. The apparatus of claim 19 wherein the means for detecting the alignment of the optical coupling comprises means for detecting an optical power of a portion of the optical beam that is not coupled to be received by the means for transmitting the optical beam.

22. The apparatus of claim 19 wherein the means for detecting the alignment of the optical coupling comprises means for detecting an optical power of a portion of the optical beam that is coupled to be received by the means for transmitting the optical beam.

23. The apparatus of claim 20 wherein the means for adjusting the alignment of the optical coupling is included in the first semiconductor substrate layer.

24. The apparatus of claim 20 wherein the means for adjusting the alignment of the optical coupling is included in a second semiconductor substrate layer separate from the first semiconductor substrate layer.

25. An apparatus, comprising:
a first semiconductor substrate layer;
a plurality of grooves formed in and spaced apart in the first semiconductor substrate layer;
a plurality of optical fibers, each one of the plurality of grooves having one of the plurality of optical fibers disposed therein; and
a plurality of optical sensors, each one of the plurality of grooves including at least one of the plurality of optical sensors, each one of the plurality of optical sensors having an output coupled to be received by circuitry to maintain alignment of optical beams optically coupled to be received by each respective one of the plurality of optical fibers.

26. The apparatus of claim 25 wherein the first semiconductor substrate layer comprises silicon and each one of the plurality of grooves comprises a V-groove formed a [1 1 1] plane of the first semiconductor substrate layer.

27. The apparatus of claim 25 wherein each one of the plurality of optical sensors comprise a P-N junction formed in the first semiconductor substrate layer.

28. The apparatus of claim 25 wherein the circuitry is disposed in the first semiconductor substrate layer.

29. The apparatus of claim 25 wherein the circuitry is disposed in a second semiconductor substrate layer.

* * * * *

UNITED STATES PATENT AND TRADEMARK OFFICE
CERTIFICATE OF CORRECTION

PATENT NO.   : 6,504,965 B2
DATED        : January 7, 2003
INVENTOR(S)  : Paniccia et al.

It is certified that error appears in the above-identified patent and that said Letters Patent is hereby corrected as shown below:

<u>Column 8,</u>
Line 17, delete "25 ID" and insert -- 251D --.

Signed and Sealed this

Eighth Day of April, 2003

JAMES E. ROGAN
*Director of the United States Patent and Trademark Office*